UNITED STATES PATENT OFFICE.

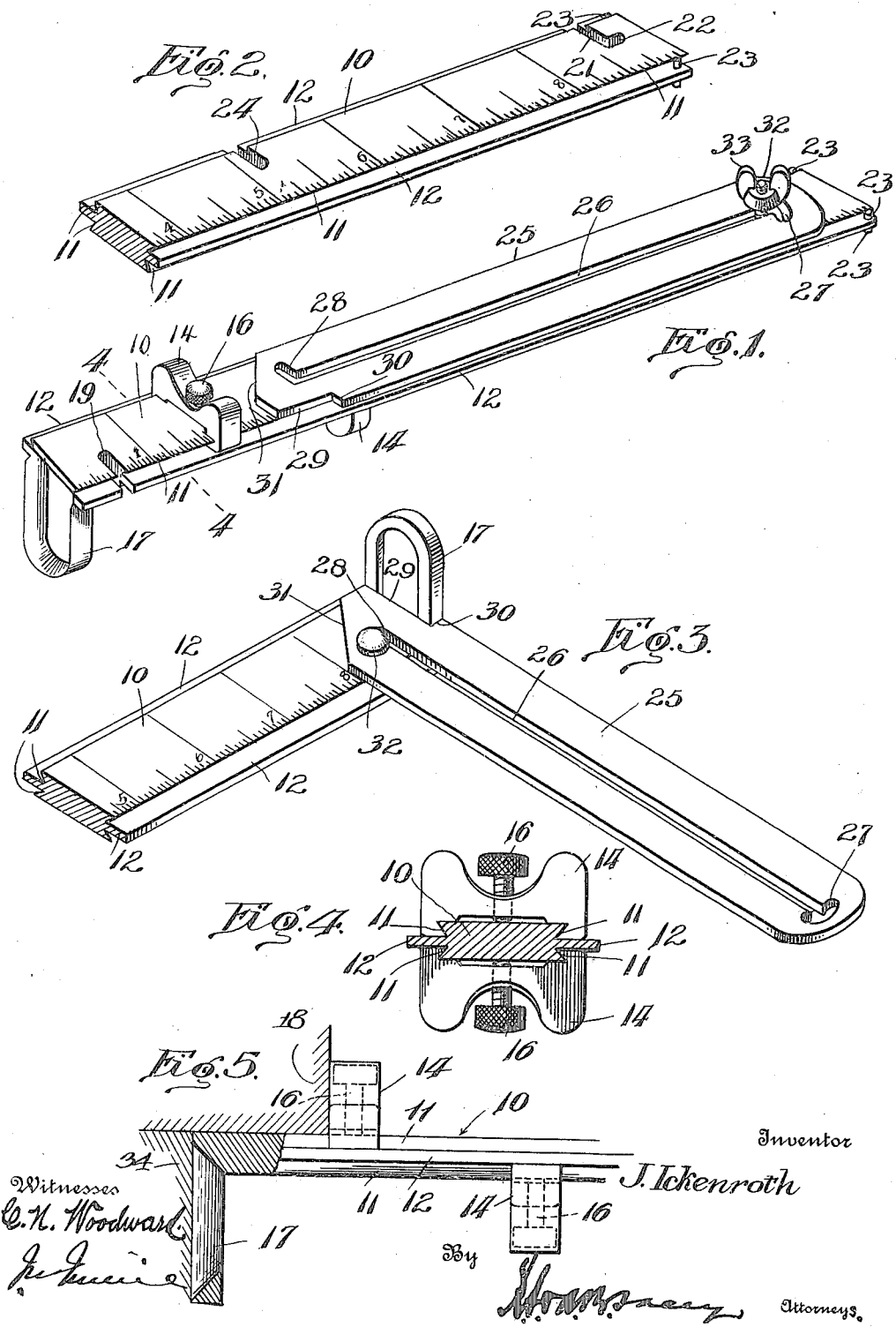

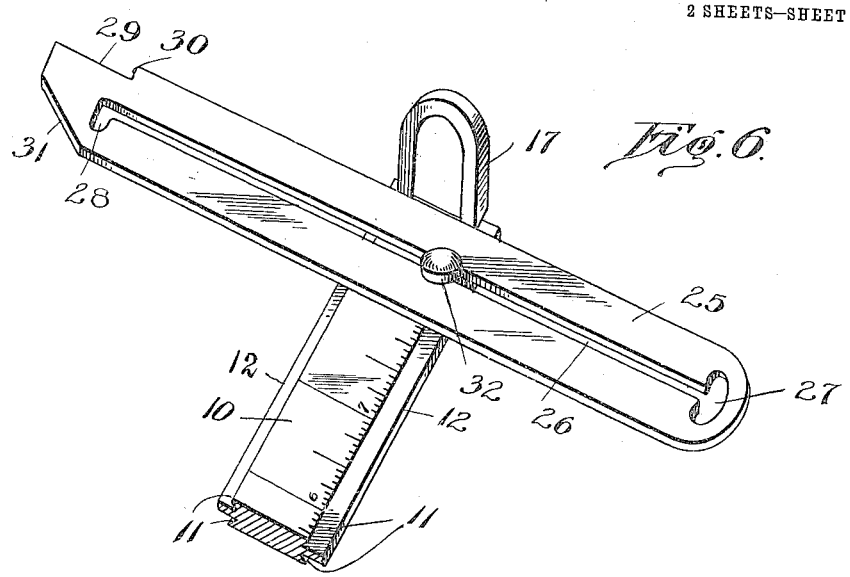
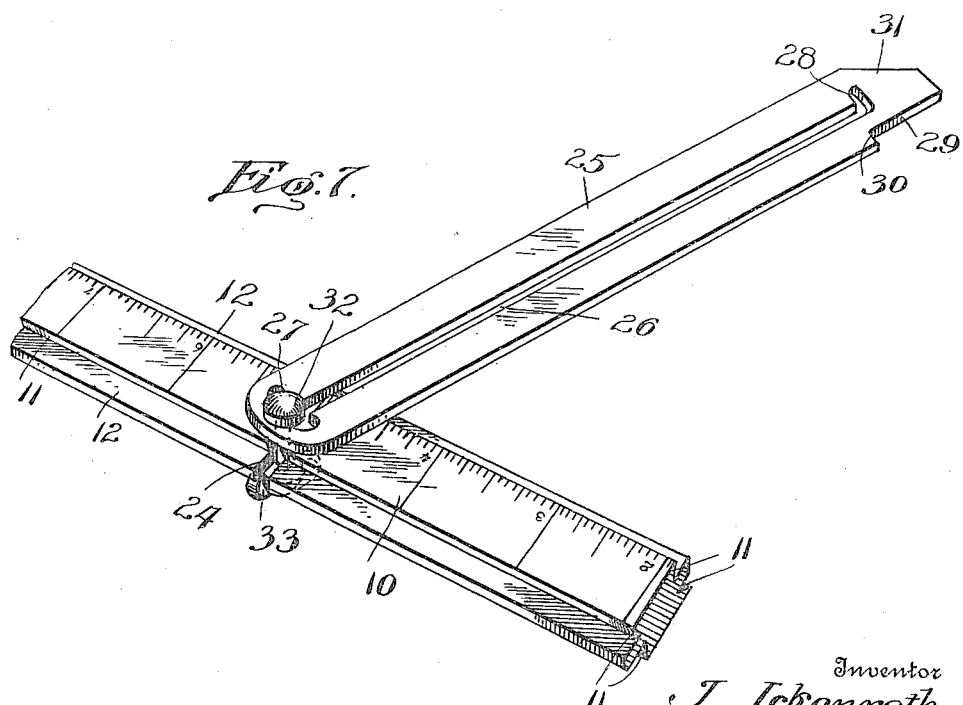

JOHN ICKENROTH, OF ST. LOUIS COUNTY, MISSOURI.

MEASURING AND GAGING IMPLEMENT.

1,128,143.　　　　　Specification of Letters Patent.　　Patented Feb. 9, 1915.

Application filed February 25, 1914.　Serial No. 821,081.

*To all whom it may concern:*

Be it known that I, JOHN ICKENROTH, citizen of the United States, residing in St. Louis county, State of Missouri, have invented certain new and useful Improvements in Measuring and Gaging Implements, of which the following is a specification.

This invention relates to improvements in combined measuring and gaging implements, more particularly to devices of this character employed by mechanics, such as bricklayers, stone setters, and the like for gaging the material and expeditiously and accurately determining the depths of projections in brickwork, stonework and the like, and has for one of its objects to simplify and improve the construction and increase the efficiency and utility of devices of this character.

Another object of the invention is to provide a simply constructed implement which may be quickly and accurately adjusted to produce a try-square, a T square, or a bevel adjustable to any required angle and arranged for use right or left handed, as may be preferred.

With these and other objects in view the invention consists in certain novel features of construction as hereinafter shown and described and then specifically pointed out in the claims; and in the drawings illustrative of the preferred embodiment of the invention—Figure 1 is a perspective view of the improved implement arranged for use in determining the overhang of projections in brickwork, stonework, terra-cotta, cornices, quoins, window sills and like projections. Fig. 2 is a perspective view of a portion of the stock of the improved implement, illustrating its construction. Fig. 3 is a perspective view of the improved implement arranged as a try-square, or the like. Fig. 4 is an enlarged section on the line 3—3 of Fig. 1. Fig. 5 is an enlarged longitudinal sectional detail. Fig. 6 is a perspective view of the improved implement arranged as a T square. Fig. 7 is a perspective view of the improved implement arranged as a bevel.

Corresponding and like parts are referred to in the following description and indicated in all the views of the drawings by the same reference characters.

The improved implement comprises a stock or "blade" 10 of any required length provided with graduations upon its opposite faces representing inches and fractions of inches. The blade 10 may be of any required length, depending upon the uses for which it will be employed. When constructed for the use of bricklayers the blade will generally be about 9 inches long, but may be made of any required length, and it is not desired therefore to limit the invention in this respect.

The edges of the stock 10 are each formed with two longitudinal channels 11 extending in parallel relation to each other and to the faces of the stock with the material between the channels extending beyond the same, as represented at 12.

Slidably disposed upon each side of the stock 10 is a gage member 14 with inwardly directed ribs for engaging in the channels 11. The lengths of the gage members 14 transversely of the stock 10 are less than the total width of the stock including the extended portions 12, so that no part of the gage members extend beyond the portions 12 of the stock. By this means the side edges of the stock are left free and unobstructed, no matter at what position the gage members may be located. It will also be noted that the gage members are slidable one past the other, as the extended portions 12 prevent them from interfering with each other when moved upon the stock.

Each of the gage members 14 is provided with a set screw 16 to enable it to be firmly clamped to the stock and thus held at any desired point thereon. The upper faces of the gage members 14 are hollow, and the set screws 16 are located entirely in the hollows so that no portion thereof projects beyond the outer face of the gage members. The turning heads of the set screw 16 are likewise less in diameter than the transverse width of the gage members so that no portion of the set screw extends beyond the side edges of the gage members to interfere with their use, as hereafter explained.

At one end the stock 10 is provided with a stop member 17, preferably in U shape. The member 17 is preferably integral with the stock 10 or stationary with its inner face at right angles to the longitudinal plane of the stock and its outer face beveled to form a continuous knife edge, while the adjacent terminal of the stock 10 is likewise beveled (see Fig. 5) to coact with the knife edge of the member 17, the object to be hereafter explained.

Formed in one edge of the stock 10 near the member 17 is a transverse slot 19. Formed in the opposite edge of the stock 10, near its opposite end, is another transverse slot 21 with its inner end offset, as shown at 22, and directed toward the adjacent end of the stock. Stop pins 23 are located at the end of the stock opposite to the member 17 to prevent the blocks 14 from being removed when the set screws 16 are released. By this means no danger exists of losing the blocks, as they cannot be separated from the stock so long as the stop pins 23 remain in position. Another transverse slot 24 is formed in one edge of the stock 10 intermediate the slots 19—21, the object to be hereafter explained. A movable blade or plate 25 also forms a part of the improved device and is provided with a longitudinally directed slot 26 closed at the ends and extending entirely through the blade, the slot being enlarged laterally at one end, as shown at 27, and with a lateral offset 28 at the opposite end. A clamp screw 32 and wing nut 33 are employed to hold the member 25 adjustably upon the stock 10. The member 25 is provided with a recess 29 at one end whereby a stop shoulder 30 is produced and with a bevel 31 likewise formed upon the member 25, the bevel preferably extending at an angle of 45 degrees to the longitudinal plane of the member 25. The blade 25 is designed to be adjusted relative to the stock 10 and clamped thereon by the set screw 32 and nut 33, to transform the implement into a try-square, a T square, or a bevel, as may be required and as hereafter explained.

In laying up brick or stone walls, much difficulty has been heretofore experienced in accurately and expeditiously determining the amount of overhang or projections in the brickwork, stonework, terra-cotta, cornices, quoins, window sills, and the like, and the improved implement enables the mechanic to very quickly and accurately adjust the overhang of such portions of a structure. To accomplish this result with the improved implement the blade 25 is either removed entirely, as it is not required when the implement is used for determining the amount of projections in walls, or disposed flatwise upon the stock as shown in Fig. 1. The stock is then turned with the stop member 17 directed downwardly and the gage member 14 which, for the time being is uppermost, adjusted to the graduation which represents the desired overhang or projection. The knife-edged portion of the stop member 17 is then thrust beneath the overhanging portion, such as a window sill, a portion of which is indicated at 18 in Fig. 5, the knife edge enabling the implement to be expeditiously employed for cutting into any surplus mortar which may have accumulated on the outer face of the wall, a portion of which is indicated conventionally at 34 in Fig. 5 and to bear squarely against the brickwork beneath the overhang. The member which is to constitute the overhanging portion is then adjusted to contact with the gage member 14 which has been adjusted upon the upper side of the stock as above mentioned, and the implement moved back and forth alongside the overhang member to determine its accurate position.

In laying up brickwork in piers, panels, pilasters, spaces between openings, or frames, and like narrow portions of the wall, much difficulty has been heretofore experienced in accurately gaging the "bond" of such narrow portions so that they conform to the bond lines of the body of the wall, and these bond lines generally require that odd lengths or fractions of bricks be used to make up the courses of the above noted narrow portions of the walls, and the improved implement will be found very useful for performing this duty expeditiously and accurately. To illustrate, suppose the pilaster, pier, or other narrow portion of the wall is 16 inches wide which would represent two bricks, but the "bond" line of every other course of the main wall of which the pier forms a part, comes say at 2½ inches from one edge of the pier, and 5½ inches from the opposite edge, consequently, the fractional bricks which occur in every other course will necessarily have to be cut 2½ inches and 5½ inches long, respectively. To accurately accomplish this result one of the gage members 14 is set on the graduated scale of the stock 10 2½ inches from the end and the other gage member set 5½ inches from the inner face of the stop member 17. This gives the bricklayer an accurately adjusted and convenient implement by which he can readily and quickly measure the fractional bricks required for his purpose. The gage members 14 in coaction with the stop member 17 and stock 10 may also be employed as a convenient implement for gaging the lengths, widths and other dimensions of bricks for outside walls, and other localities where uniformity is required. In laying up outside walls it is necessary to carefully select bricks of uniform thickness and length, and to do this work one of the members 14 is located upon one side of the stock to correspond to the required lengths of the bricks and the other gage member located upon the opposite side of the stock to regulate the required thickness of bricks.

To form the improved implement into a try-square the blade 25 is detached and the recess 29 located in contact with the inner face of the stop member 17. When thus located the clamp screw 32 is located in the slot 19 and likewise located through the slot 26 and into the offset 28 of the member 25, and the wing nut 33 operated to clamp the member 25 in close engagement with the inner face of the stop member 17 with the shoulder 30 against the adjacent edge of the stop member. By this means the blade 25 is accurately clamped in position at right angles to the stock 10 and transforms the implement into an accurate try-square, as shown in Fig. 3. If it is desired to transform the implement into a T square the set screw 32 is loosened and the blade 25 moved longitudinally of the stock 10 until the slot 19 is opposite the set screw. This will enable the blade 25 to be moved transversely of the stock with the slot 26 engaging over the set screw. When the blade has been moved to about its central position upon the stock 10 it is pressed against the inner face of the stop member 17 and the nut 33 set up. This holds the member 25 at right angles to the stock and projecting at each end beyond the stock, as shown in Fig. 6.

If the implement is to be transformed into a bevel the set screw is released and the blade detached and the set screw inserted into the slot 21 and the blade adjusted at any required angle relative to the stock. Preferably the set screw will be forced into the offset 22 of the slot 21 while the blade 25 may be adjusted laterally to cause the set screw to enter the lateral slots 27.

If a two-part bevel is required the set screw is inserted into the slot 24 with the blade 25 located at any angle transversely of the stock. By this means the blade 25 may be adjusted relative to the stock at any angle and at any required length within the range of the slot 26.

The improved implement is simple in construction, can be inexpensively and accurately manufactured of any required size and of any required length, and employed for a variety of purposes, as will be obvious.

Having thus described the invention, what is claimed as new is:

1. An implement of the class described comprising a stock having a stationary stop directed laterally from one side and provided with an outwardly directed cutting edge, a gage member movable upon said stock at the other side, and means for adjustably coupling said gage member to the stock.

2. An implement of the class described comprising a stock, a stationary stop extending from said stock at one end with its outer side knife-edged with the knife edge at right angles to the stock, a gage member movable upon the stock at the side opposite to the knife-edged stop, and means for adjustably coupling said gage member to the stock.

3. An implement of the class described comprising a stock, a stationary stop directed laterally therefrom at one end, a blade having a longitudinally directed slot with a lateral offset and with a recess and stop shoulder adjacent to the offset end of the slot, a clamp device carried by the stock and engaging in the slot and offset of the blade with the recess and stop shoulder in engagement with the stationary stop of the stock.

In testimony whereof I affix my signature in presence of two witnesses.

JOHN ICKENROTH. [L. S.]

Witnesses:
Jno. C. Swanson,
R. L. Frisby.